Figure 1:
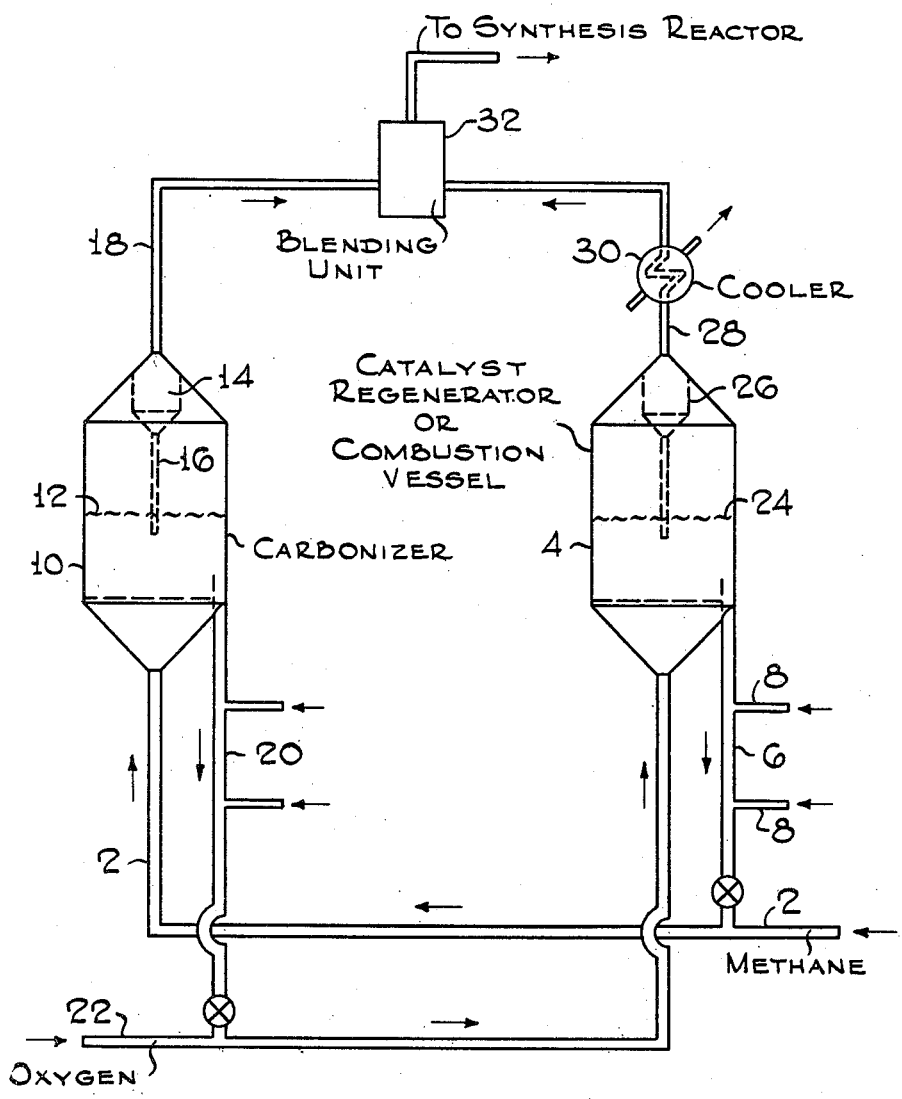

Oct. 5, 1954  W. A. HERBST  2,690,963
PREPARATION OF HYDROCARBON SYNTHESIS GAS
Filed Sept. 15, 1948  2 Sheets-Sheet 2

Walter A. Herbst Inventor
By J. Cachman Attorney

Patented Oct. 5, 1954

2,690,963

UNITED STATES PATENT OFFICE 2,690,963

PREPARATION OF HYDROCARBON SYNTHESIS GAS

Walter A. Herbst, Union, N. J., assignor to Standard Oil Development Company, a corporation of Delaware Application September 15, 1948, Serial No. 49,449

4 Claims. (Cl. 48—196)

The present invention relates to the manufacture of hydrocarbon synthesis gas from normally gaseous hydrocarbons, such as methane and natural gas. More specifically, the present invention relates to a particularly advantageous process for preparing mixtures of carbon monoxide and hydrogen of any desired proportions and composition for use in the catalytic synthesis of valuable liquid hydrocarbons and oxygenated organic compounds.

It is now well known in the art that valuable liquid hydrocarbons and oxygenated hydrocarbons may be prepared from mixtures of CO and $H_2$, or synthesis gas, as this mixture is called. It is also known that the composition of the resultant products obtained from the hydrocarbon synthesis reaction is to a significant extent dependent upon, among other factors, the composition of the synthesis feed gas mixture. Thus when the feed gas composition is approximately 2 mols hydrogen and 1 mol carbon monoxide, and a cobalt catalyst is employed at pressures not far above atmospheric, the liquid reaction product is found to consist predominantly of saturated hydrocarbons. On the other hand, if an iron catalyst is employed at somewhat higher pressures, and a somewhat lower ratio of $H_2/CO$, the product is considerably more olefinic and hence of greater commercial interest as a motor fuel.

The production of synthesis gas from natural gas by partial oxidation of the latter by oxygen or an oxygen carrier is well known in the art. Thus, in the reaction

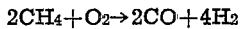

there is formed a synthesis gas mixture wherein the $H_2/CO$ ratio is 2 to 1. Another well known process for the manufacture of synthesis gas from natural gas is the reformation of methane with steam, which proceeds as follows:

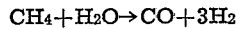

In this reaction, the ratio of $H_2$ to CO is 3 to 1. However, the ratio of hydrogen to carbon monoxide consumed in the synthesis step is considerably lower than the ratio in which these gases are present in the fresh feed, and as a result, low conversion of the synthesis gas to useful products occurs. To overcome this disadvantage, recycling of the gas from the synthesis reactor outlet to the feed inlet or to the synthesis gas generator has been proposed, the carbon dioxide present in the tail gas reacting in the first instance with part of the hydrogen to form carbon monoxide and water, and in the second case reacting with methane to form carbon monoxide and water. In either case, this recycling step, requiring compressors and recycling of large quantities of non-reacting gases besides the desired $CO_2$, is a difficult and expensive process.

It is the principal purpose of the present invention to provide a novel and advantageous means of preparing hydrocarbon synthesis gas of any desired composition and any desired ratio of hydrogen to carbon monoxide suitable for use in the synthesis of hydrocarbons, thus affording the high degree of flexibility to a hydrocarbon synthesis plant.

A further object and purpose of the invention is to produce separately substantially pure carbon monoxide and hydrogen from natural gas or methane.

Other and further objects of the invention will appear from the following more detailed description.

It has now been found that substantially pure CO and $H_2$ may be readily prepared from natural gas or methane by a process involving thermally decomposing the methane in the presence of a fluidized catalyst into carbon and hydrogen. The hydrogen may then be removed overhead, while the carbon and the catalyst whereon it is deposited may then be treated in one of two ways, depending upon the economic integration of the plant. If an oxygen plant is available, the catalyst is regenerated and the carbon burned with oxygen under controlled and suitable conditions to form carbon monoxide in a fluidized reaction vessel. The regenerated catalyst may then be returned to the methane decomposition step, and the hydrogen from the latter, and the carbon monoxide from the combustion stage may be blended in any desired proportions and sent to the synthesis reactor. Alternately, if an oxygen plant is not available, the fluidized catalyst whereon carbon is deposited may be removed from the methane decomposition stage, part of the carbonized catalyst may then be burned with air to regenerate the catalyst and form a gas consisting predominantly of carbon dioxide and nitrogen. The $CO_2$ may be scrubbed from this gas mixture by any known means, as with amino alcohols, and the recovered $CO_2$ may then be contacted in a fluidized solids reaction zone with the remaining portion of the carbonized catalyst, with which it reacts to form CO and regenerate the catalyst, in accordance with the reaction

The carbon monoxide thus formed may then be blended with the hydrogen stream to form synthesis gas of any desired composition, which may then be sent to the synthesis stage.

The invention will best be understood by referring to the accompanying diagrammatic representations, which represent modifications of the present invention in accordance with the above. Referring now to Figure I, which represents schematically an operation wherein an oxygen plant is a part of the synthesis unit, methane or natural gas is passed through line 2 and is mixed with hot regenerated catalyst withdrawn from combustion vessel 4 through standpipe 6, which may have aeration taps 8 through which a current of gas is passed into the standpipe for fluidizing the solids therein. As will be more fully disclosed hereinafter, the solids in combustion vessel 4 are in the form of a finely divided powder, and they circulate through the system functioning catalytically in the methane decomposition step, and also as heat carriers. The mixture of catalyst and methane-containing gas is discharged from line 2 into the bottom of carbonization or gas decomposition vessel 10, which vessel is maintained at a temperature level sufficiently high to cause methane to crack, forming coke or carbon, which is deposited on the catalyst, and also hydrogen. In carbonizer 10 the catalyst is maintained in the form of a dense turbulent suspension by controlling the linear velocity of the upflowing gasiform material within the limits of from about 0.1–5 feet per second. The powdered catalyst under these conditions assumes the form of a dense fluidized bed having a well defined upper level 12, and having a density of about 20–150 lbs./cu. ft. depending upon fluidization conditions and particle size, which may be within the range of from about 5 to about 500 microns. The catalyst itself may be any one of the type favoring decomposition of methane into hydrogen and carbon, though a preferred composition of such catalyst is one comprising kaolin and containing about 12% nickel, 2% chromia, and 3% cupric oxide. Within carbonizer 10 a temperature level in the range of 1300 to 2500° F., preferably in the range of 1600 to 2000° F. is maintained, the heat for the endothermic cracking reaction being supplied by the sensible heat of the regenerated catalyst as will be made clear hereinafter. Pressure within carbonizer 10 may be in the range of 0 to 500 p. s. i. g. Although in general the methane decomposition is favored by low pressures the integration of this step with the subsequent synthesis operation may indicate higher pressures to be the most economical. The hydrogen produced by the cracking reaction, and any residual methane are withdrawn from above upper level 12, passed through a gas-solids separating device, such as cyclone 14 equipped with dip-pipe 16, whereby separated fines are returned to the fluid solids bed below upper level 12 and the hydrogen is then conveyed through line 18 to storage or to blending with carbon monoxide, as will be shown hereinafter.

The spent catalyst and the coke and carbon deposited thereon are continuously withdrawn from carbonization vessel 10 through aerated standpipe 20 into line 22 where the solids are picked up by a stream of oxygen from any convenient source, such as an air liquefaction plant. The suspended solids are then conveyed to combustion vessel 4, which is similar in design to carbonization vessel 10. Within vessel 4 regeneration of the catalyst takes place. The solids are suspended in the form of a dense turbulent mass in the upwardly-flowing gasiform medium to form a dense bed with an upper level 24. Conditions of gas velocity, temperature and oxygen concentration are maintained such that oxidation is controlled to form substantially CO. To facilitate the transfer of the heat from the combustion vessel 4 to the carbonizer (vessel 10) the temperature within vessel 4 should at all times be maintained more than 50° F. higher and preferably 100 to 200° F. higher than in vessel 10. Thus the temperature in vessel 4 is maintained within the range of 1350 to 2700° F., preferably within the range of from about 1700 to 2200° F., and the rate of oxygen flow being about 15 cubic feet (standard conditions of temperature and pressure) per lb. carbon deposited on the catalyst. Pressure within vessel 4 is of the same order of magnitude as in vessel 10 viz. 0 to 500 p. s. i. g. Fluidization conditions within combustion vessel 4 are similar to those within carbonizer 10 the density of the fluidized bed being dependent on the superficial velocity of the upflowing gasiform medium and the particle size.

Substantially pure carbon monoxide is withdrawn upwardly from combustion vessel 4, freed from entrained fines in cyclone 26, and is then passed through line 28 and cooler 30 to blending unit 32, where it may be blended with hydrogen from the carbonization vessel 10 to give any desired composition of hydrocarbon synthesis feed gas. The synthesis gas thus produced may then be sent to a hydrocarbon synthesis unit (not shown).

Regenerated catalyst at regeneration temperatures may be withdrawn continuously or intermittently from the bottom of combustion vessel 4 and passed through aerated standpipe 6 to line 2 where the solids are picked up by the entering natural gas stream and the suspension conveyed to carbonization vessel 10 as previously described.

Figure 2:
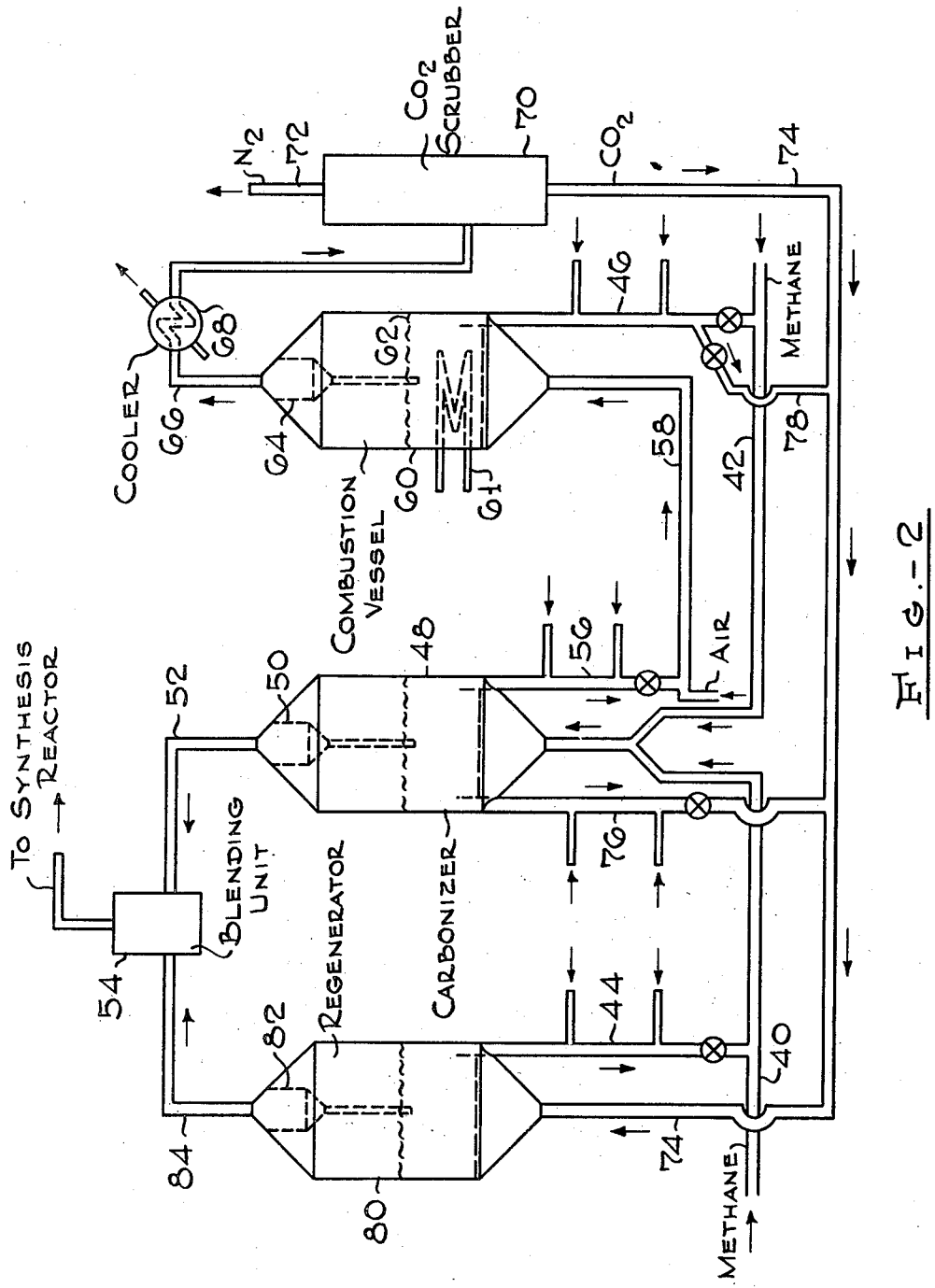

Referring in detail to Figure 2, in this modification, air instead of oxygen is used in the combustion step. Natural gas or methane is passed through lines 40 and 42. The gas passing through line 40 picks up hot regenerated catalyst from aerated standpipe 44 and the gas passing through line 42 picks up hot regenerated catalyst from aerated standpipe 46, and both streams of solids suspended in gas are fed into a lower portion of carbonization vessel 48. Reaction conditions within carbonizer 48 are substantially similar to these described for the comparable operation in Figure I, the heat for cracking of the methane being supplied as sensible heat of the regenerated catalyst. The catalyst in carbonization vessel 48 is in the form of a dense turbulent mass resembling a boiling liquid, the fluidized bed being supported by the upflowing gas stream. The temperature within carbonization zone is maintained in the range of from about 1300 to 2500° F., preferably between 1600 and 2000° F. The pressure is about 0 to 500 p. s. i. g. Hydrogen resulting from the cracking reaction is withdrawn overhead through gas-solids separator 50 and may be passed through line 52 to synthesis gas blending unit 54 or to storage.

A portion of spent catalyst and the carbon deposited thereon from the methane cracking process may be continuously withdrawn from the bottom section of carbonizer 48 through aerated standpipe 56 and discharged into line 58. The spent catalyst is picked up by a stream of preheated air, and the solids suspended in the air stream are conveyed through line 58 into the bottom of fluidized combustion vessel 60, which may be equipped with cooling coil 61 and is similar in design and operation to the comparable unit shown in Figure I. Within combustion vessel 60 regeneration of the catalyst takes place while the solids are suspended as a dense turbulent mass in the upwardly flowing gasiform medium, forming a dense bed with a well-defined upper level 62. Temperature within combustion vessel 60 is in the range of from about 1500 to 2700° F., preferably 1700 to 2100° F. and the superficial linear velocity of the gas in the range of about 0.2 to 2.0 ft./sec. Combustion of the carbonaceous material deposited upon the catalyst is carried out substantially to completion, so that carbonaceous material is transformed substantially into $CO_2$.

Regenerated catalyst substantially at regeneration temperatures may be continuously withdrawn from the bottom portion of carbonizer 60 through aerated standpipe 46, passed to line 42, where it is picked up by the incoming fresh feed gas and conveyed to the methane cracking unit 48.

Carbon dioxide and nitrogen are withdrawn overhead from above the fluidized bed in combuster 60, freed of entrained solids in cyclone 64, and passed through line 66 and cooler 68 into carbon dioxide scrubber 70, where $CO_2$ is removed and separated from $N_2$ in a manner known per se, such as absorption in an amino alcohol, and subsequent stripping of absorbed $CO_2$ by heat or steam. Nitrogen may be removed overhead through line 72, and recovered carbon dioxide through line 74.

Returning now to methane decomposition vessel or carbonizer 48, the remaining portion of spent catalyst is withdrawn through aerated standpipe 76 and is passed to line 74 where it is suspended in the $CO_2$ withdrawn from scrubber 70. The suspension of spent catalyst with carbon deposited on its surface is then conveyed through line 74 to fluidized reaction vessel 80, wherein the spent catalyst is kept in an ebullient turbulent suspension by the regenerating gas. The temperature within vessel 80 is maintained in the range of from about 1300 to 2500° F., heat being supplied by a convenient means, much as by external or internal coils (not shown). Alternately the heat required in vessel 80 may be supplied by circulating to it a fraction of the hot regenerated catalyst from vessel 60 via line 78. This then passes with the decarbonized catalyst out of vessel 80 to vessel 48 to complete the cycle as described below. Pressure in vessel 80 is about 0 to 500 p. s. i. g. As a result of the reaction $CO_2 + C \rightarrow 2CO$, the carbon on the catalyst may be substantially oxidized to carbon monoxide.

Regenerated catalyst may be withdrawn from vessel 80 through aerated standpipe 44, discharged into natural gas feed line 40, and the suspension of regenerated catalyst in gas conveyed to carbonizer 48. The carbon monoxide formed by oxidation of carbon may be withdrawn from vessel 80, freed of entrained catalyst in cyclone 82 and passed through line 84 to storage or to synthesis gas blending unit 54 for blending with hydrogen to give the desired composition of synthesis gas to be sent to the hydrocarbon synthesis reactor.

Though any type of methane cracking catalyst of satisfactory fluidity may be used, particularly good results are obtained when a kaolin catalyst containing about 12% nickel, 2% chromia and 3% cupric oxide is employed. With a catalyst of such composition, methane conversion of over 95% may be attained at about 1800° F. with a contact time of about 44 seconds.

The embodiment of the invention as illustrated in the figures and in the foregoing description admits of modifications readily apparent to those skilled in the art. Thus heat economies may be attained by passing streams of gases and solids and their suspensions in proper heat exchange relation with one another. For circulating the solids between the respective reactors, mechanical conveyors, lock-hoppers etc., may be used as well as standpipes. Instead of using natural gas or methane, other low molecular weight hydrocarbon gases may be used, either alone or admixed with natural gas or methane.

What is claimed is:

1. A process for preparing synthesis gas which consists in passing a normally gaseous paraffinic hydrocarbon into a carbonization zone, contacting said gaseous hydrocarbon at gaseous hydrocarbon cracking conditions with a dense fluidized mass of finely divided cracking catalyst consisting essentially of about 12% by weight of nickel, about 2% by weight of chromia, about 3% by weight of cupric oxide and about 83% by weight of kaolin, maintaining cracking temperatures within said carbonization zone, permitting the paraffinic hydrocarbon to remain resident in said zone for a sufficient period of time to effect cracking of said paraffinic hydrocarbon and deposition of carbon on the fluidized cracking catalyst, withdrawing hydrogen from said carbonization zone, withdrawing carbonized catalyst from said carbonization zone, conveying at least a portion of said carbonized catalyst into a catalyst regeneration zone, maintaining said material in a dense, turbulent suspension in said regeneration zone, contacting said carbonized catalyst at catalyst regeneration conditions with an oxidizing gas chosen from the group consisting of oxygen and carbon dioxide whereby carbon deposited upon the catalyst is converted substantially into carbon monoxide and said catalyst is regenerated, withdrawing a total gaseous effluent consisting essentially of carbon monoxide from said catalyst regeneration zone, and mixing said withdrawn hydrogen and carbon monoxide in proportions suitable for employment in a hydrocarbon synthesis operation.

2. A process according to claim 1 in which the oxidizing gas is oxygen.

3. A process according to claim 1 in which the oxidizing gas is carbon dioxide.

4. The method set forth in claim 1 in which a portion of the carbonized catalyst withdrawn from the carbonization zone is conveyed to a catalyst regeneration zone and another portion of said carbonized catalyst is conveyed to a combustion zone, the catalyst conveyed to the combustion zone is treated with a gaseous oxidizing medium while maintained in said combustion zone in the form of a dense turbulent suspension by an upwardly flowing stream of said gaseous oxidizing medium, converting carbonaceous solid deposited on the said catalyst substantially to carbon dioxide in said combustion zone, withdrawing a gaseous product containing carbon dioxide from said combustion zone, recovering carbon dioxide from said gaseous product, and passing said carbon dioxide to said regeneration zone as the oxidizing gas.

References Cited in the file of this patent

UNITED STATES PATENTS

| Number | Name | Date |
|---|---|---|
| 1,868,919 | Schmidt et al. | July 26, 1932 |
| 1,868,921 | Schmidt et al. | July 26, 1932 |
| 1,992,909 | Davis | Feb. 26, 1935 |
| 2,405,395 | Bahlke et al. | Aug. 6, 1946 |
| 2,445,328 | Keith | July 20, 1948 |
| 2,471,104 | Gohr | May 24, 1949 |
| 2,527,575 | Roetheli | Oct. 31, 1950 |
| 2,560,403 | Arveson | July 10, 1951 |